US008699444B2

(12) United States Patent
Steer et al.

(10) Patent No.: US 8,699,444 B2
(45) Date of Patent: Apr. 15, 2014

(54) BROADCAST SYSTEM INTERFERENCE PROTECTION METHOD AND APPARATUS

(75) Inventors: David Steer, Ontario (CA); Claude Royer, Quebec (CA)

(73) Assignee: Apple Inc., Cupertino, CA (US)

( * ) Notice: Subject to any disclaimer, the term of this patent is extended or adjusted under 35 U.S.C. 154(b) by 984 days.

(21) Appl. No.: 11/962,307

(22) Filed: Dec. 21, 2007

(65) Prior Publication Data

US 2009/0161608 A1    Jun. 25, 2009

(51) Int. Cl.
*H04W 4/00*    (2009.01)
*H04B 7/00*    (2006.01)

(52) U.S. Cl.
USPC .......................................... 370/330; 455/522

(58) Field of Classification Search
USPC .......................................................... 370/330
See application file for complete search history.

(56) References Cited

U.S. PATENT DOCUMENTS

| 6,658,269 | B1 * | 12/2003 | Golemon et al. | ........... | 455/562.1 |
| 7,804,918 | B2 * | 9/2010 | Kim et al. | ...................... | 375/324 |
| 2002/0191646 | A1 * | 12/2002 | Hyakutake | ..................... | 370/535 |
| 2004/0042390 | A1 * | 3/2004 | Celebi et al. | ................... | 370/210 |
| 2005/0195769 | A1 * | 9/2005 | Kaewell et al. | ................ | 370/335 |
| 2006/0098592 | A1 * | 5/2006 | Proctor Jr. et al. | ............ | 370/315 |
| 2006/0104257 | A1 * | 5/2006 | Laroia et al. | .................. | 370/350 |
| 2006/0252404 | A1 * | 11/2006 | Karkas et al. | .............. | 455/343.2 |
| 2009/0059783 | A1 * | 3/2009 | Walker et al. | .................. | 370/208 |
| 2009/0147728 | A1 * | 6/2009 | Atia et al. | ...................... | 370/321 |

OTHER PUBLICATIONS

Costa, Max H.M., "Writing on Dirty Paper", IEEE Transactions on Information Theory, vol. IT-29, No. 3, May 1983, pp. 493-441.

* cited by examiner

*Primary Examiner* — Afshawn Towfighi
(74) *Attorney, Agent, or Firm* — Fay Kaplun & Marcin, LLP

(57) ABSTRACT

A method and transceiver in a secondary system for utilizing channel bandwidths allocated to a primary system. A secondary system transceiver receives a primary system signal, re-transmits a delayed version of the primary system signal, and communicates with secondary system equipment utilizing secondary system signals within at least part of a bandwidth of at least one channel of the primary system. The re-transmission of the primary system signal allows the use of primary system channels by the secondary system without adversely affecting the primary or secondary system users.

23 Claims, 4 Drawing Sheets

BROADCAST SYSTEM INTERFERENCE PROTECTION METHOD AND APPARATUS

FIELD OF THE INVENTION

The present invention relates to wireless broadcast communications, and more particularly to interference protection in a wireless broadcast system.

BACKGROUND

Radio systems are sometimes used in environments where two systems share the same spectrum assignment and channels. The primary and secondary systems may have different deployment scenarios and may have different services. Secondary systems, for example, may be permitted to use unused local channels in the primary system as long as they do not cause interference or loss of performance to the users of the primary system. However, the transmitters of the secondary system may cause interference to the receivers of the primary system if the secondary system transmitters are in close proximity to the primary system receivers, i.e. the secondary system signals transmitted by the secondary system transmitters are received at the primary system receivers at a power that is greater than or equal to the power of the primary system signals received from the primary system transmitters.

Even when channel assignments for the primary and secondary systems are mutually exclusive (i.e., no channel is simultaneously assigned to both systems), when using adjacent (or nearby adjacent) channels, out-of-channel emissions or the spurious response of the primary system receivers may still cause interference and blocking of the primary system receivers. Blocking of the primary system receivers prevents the sharing of the unused channels by another service except in cases where the secondary system can be physically separated by a large distance from the primary system receivers so that the power of the secondary system signals transmitted by the secondary system are negligible in comparison to the primary system signals received at the primary system receivers. As primary system receivers may generally be located anywhere, such a requirement is not generally practical. Potential interference from a secondary system also prevents the reuse of adjacent channels in many system deployments, as "guard" channels are left between occupied channels in order to prevent interference from adjacent channels. It has therefore proven impractical to date to generally permit unused channels of the primary system to be used by a secondary system.

SUMMARY OF THE INVENTION

According to one broad aspect, the present invention provides a method in a secondary system for utilizing channel bandwidths allocated to a primary system, comprising: in a secondary system transceiver: receiving a primary system signal; re-transmitting a delayed version of the primary system signal; and communicating with secondary system equipment utilizing secondary system signals within at least part of a bandwidth of at least one channel of the primary system.

In some embodiments, re-transmitting a delayed version of the primary system signal comprises re-transmitting the delayed version of the primary system signal with a power selected to preserve a signal-to-interference ratio of the primary system signal at primary system receivers.

In some embodiments, timing of the delayed version of the primary system signal is selected to be within multipath delay capability of primary system receivers.

In some embodiments, the method further comprises: making use of the received primary system signal to at least partially reduce interference to the secondary system signals.

In some embodiments, making use of the received primary system signal to at least partially reduce interference to the secondary system signals comprises coding the secondary system signals making use of knowledge of the primary system signal.

In some embodiments, coding the secondary system signals comprises coding the secondary system signals using dirty paper coding.

In some embodiments, coding of secondary system signal channels in the secondary system signals varies with proximity of the secondary system signal channels to primary system signal channels in the primary system signal.

In some embodiments, setting the power level of secondary system signal channels in the secondary system signals varies with proximity of the secondary system signal channels to primary system signal channels in the primary system signal.

In some embodiments, communicating with secondary service equipment comprises transmitting secondary service signal waveforms that reduce interference to primary system receivers.

In some embodiments, the primary system comprises a broadcast television service, and wherein transmitting secondary service signal waveforms that reduce interference to primary system receivers comprises transmitting at least some of the secondary system signals during blanking intervals of the broadcast television service.

In some embodiments, the secondary system signals have symbol rates that are synchronized to a symbol rate of the primary system signal.

In some embodiments, carrier phase of the secondary system signals are locked to the re-transmitted delayed version of the primary system signal.

In some embodiments, secondary system signal timing corresponds to primary system signal timing.

In some embodiments, channel allocation in the primary system and channel allocation in the secondary system are set by a common service operator.

In some embodiments, the primary system signal and the secondary system signals are set by different service operators.

In some embodiments, the method is executed in a base station.

In some embodiments, the method is executed in user equipment, and the secondary system equipment includes at least one of: other user equipment and a base station.

In some embodiments, the method is executed in any one of: a base station and user equipment.

In some embodiments, the user equipment comprises any one of a mobile telephone station, a personal digital assistant, a wireless local area network access point and a wireless-capable personal computer.

In some embodiments, the primary system signal has an orthogonal frequency division multiplexing (OFDM) signal format.

In some embodiments, timing of the delayed version of the primary system signal is selected such that the primary system signal and the re-transmitted delayed version of the primary system signal arrive at primary system receivers within a cyclic prefix interval of the OFDM signal format.

In some embodiments, the OFDM signal format comprises any one of: Digital Video Broadcast (DVB) signal format, Forward Link Only (FLO) signal format and WiMAX signal format.

In some embodiments, the primary system signal has a single carrier signal format.

In some embodiments, timing of the delayed version of the primary system signal is selected such that the primary system signal and the re-transmitted delayed version of the primary system signal arrive at primary system receivers within an equalizer window.

In some embodiments, the single carrier signal format comprises any one of: National Television System Committee (NTSC) signal format, Advanced Television System Committee (ATSC) signal format and Advanced Vestigial Side-Band (A-VSB) signal format.

In some embodiments, receiving a primary system signal comprises receiving a plurality of primary system signals, and wherein re-transmitting a delayed version of the primary system signal comprises re-transmitting a delayed version of the plurality of primary system signals.

According to another broad aspect, the present invention provides a secondary system transceiver for utilizing in a secondary system channel bandwidths allocated to a primary system, comprising: a primary system portion that: receives at least one primary system signal; and re-transmits a delayed version of the at least one primary system signal; and a secondary system portion that communicates with secondary system equipment utilizing secondary system signals within at least part of a bandwidth of at least one channel of the primary system.

In some embodiments, the primary system portion comprises: a primary system signal receiver that receives the at least one primary system signal from at least one of: a wireless interface via a primary system signal receive antenna; and a non-wireless interface via at least one of: a wired connection; and a fibre connection.

In some embodiments, the secondary system transceiver further comprises: a primary system signal power controller that conditions power level of the at least one primary system signal that is received by the primary system signal receiver such that the re-transmitted delayed version of the at least one primary system signal has a power selected to preserve a signal-to-interference ratio of the at least one primary system signal at primary system receivers.

In some embodiments, the secondary system transceiver makes use of the received primary system signal to at least partially reduce interference to the received secondary signals due to the re-transmission of the primary system signal.

In some embodiments, the primary system portion and the secondary service portion share a common antenna for re-transmitting the delayed version of the at least one primary system signal and for transmitting and receiving the secondary system signals.

In some embodiments, the common antenna also functions as the primary system signal receive antenna to receive the at least one primary system signal.

In some embodiments, the primary system signal receiver receives the at least one primary system signal from at least one of: a satellite system; and a distribution network used to send signals to primary system signal transmitters.

In some embodiments, the primary system portion re-transmits a delayed version of the at least one primary system signal with timing selected to be within multipath delay capability of the at least one primary system signal at primary system receivers.

In some embodiments, the secondary system signals are designed to reduce interference at primary system receivers.

In some embodiments, the secondary system portion makes use of the at least one received primary system signal to substantially cancel interference due to the re-transmission of the at least one primary system signal.

In some embodiments, making use of the at least one received primary system signal comprises coding the secondary system signals making use of knowledge of the at least one primary system signal.

In some embodiments, coding the secondary system signals comprises coding the secondary system signals using dirty paper coding.

In some embodiments, the secondary system portion locks carrier phase of the secondary system signals to the re-transmitted delayed version of the at least one primary system signal.

In some embodiments, the secondary system transceiver is part of a piece of user equipment.

In some embodiments, the secondary system transceiver is part of a base station.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying drawings, in which.

In the drawings, when the same part is illustrated in multiple figures, the same reference numeral is used to identify it.

DETAILED DESCRIPTION

Figure 1:
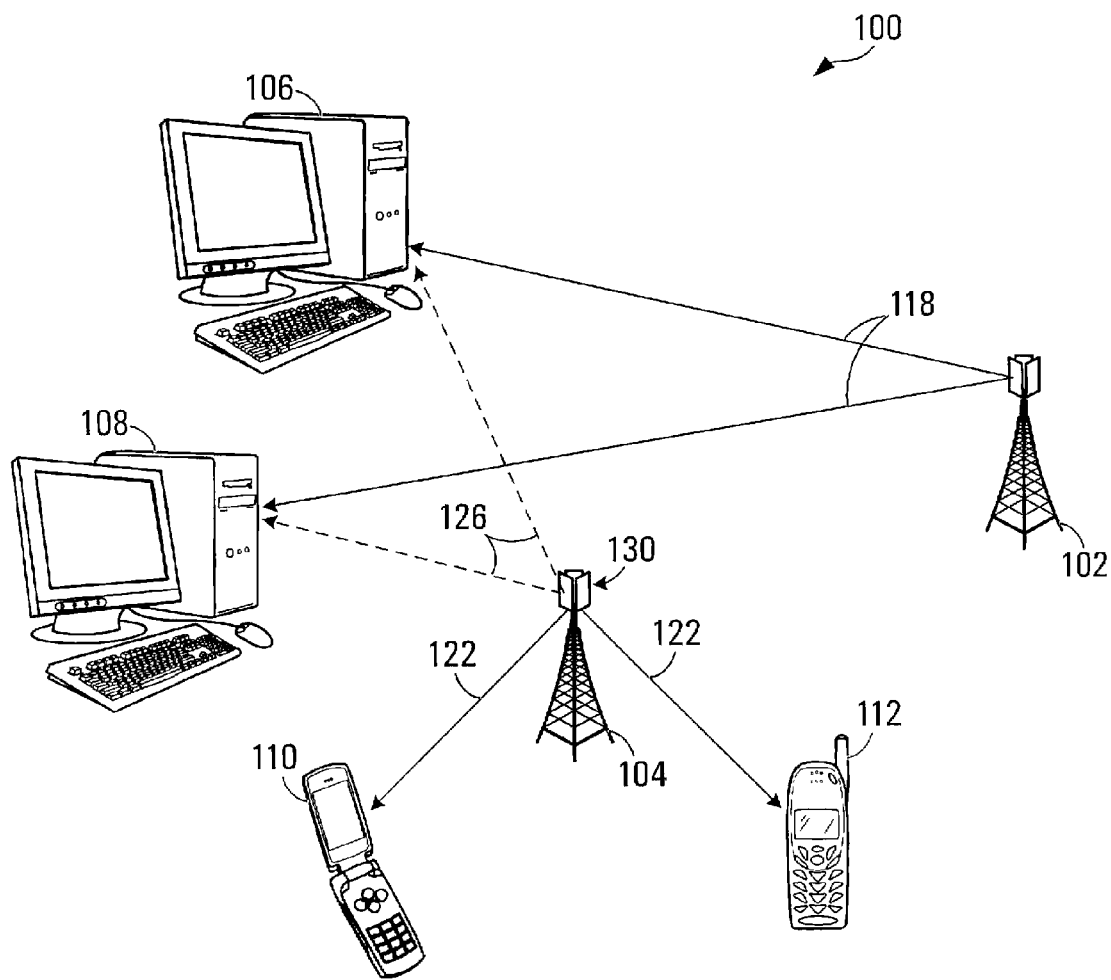
FIG. 1 is a diagram illustrating the potential interference to primary system receivers caused by secondary system signals generated by secondary system transmitters.

In the following detailed description of sample embodiments, reference is made to the accompanying drawings, which form a part hereof, and in which is shown by way of illustration specific sample embodiments in which the present invention may be practised. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Various methods and apparatus are provided to allow a secondary wireless communications system to share spectrum resources with a primary broadcast system without secondary system signals generated by the secondary system causing significant interference at the primary system receivers of the primary system. Effectively, the method allows locally unused primary channels to be reused for general communications applications without spoiling the reception on the active primary channels at primary system receivers. Embodiments of the method involve re-transmitting the primary system signals transmitted from primary system transmitter sites of the primary system from secondary system transmitter sites of the secondary system that also transmit secondary system signals. With this technique, the re-transmitted primary system signals are transmitted from the same location (i.e., the secondary system transmitters) as the secondary system signals and so the signal to interference ratio (i.e., the primary system signal to secondary system signal ratio) at the primary system receivers can be maintained by selecting the power ratio of the re-transmitted primary system signals to the secondary system signals at the secondary system transmitters. In addition, the secondary system signals may be designed to include coding to minimise interference among the primary and secondary systems. Thus, the coverage of the primary system may be improved through re-transmission of the primary system signals with the secondary system transmitters. In some embodiments, this can be achieved without any modification to the primary system receivers or transmitters.

By selecting the delay between the primary system transmission and the re-transmitted primary system signals to be within the multi-path propagation delay of the radio channel, the primary system receivers may take advantage of the multiple delayed version of the primary system signal that they will receive as a result of the combination of the transmitted primary system signal and the re-transmitted primary system signal, and maintain a signal reception that may be better than if only a single primary system signal were present.

Primary radio systems may be designed to operate in a dedicated spectrum assignment (band) with a very low acceptable interference from outside sources. The level of acceptable interference is usually expressed in terms of interference rejection performance, which is typically expressed in terms of the ratio of the desired to undesired signal strengths (D/U). When this is expressed in decibels (dB), it is typically a negative number for out-of-channel interference; that is, the undesired signal level is greater than the desired signal. Low values (i.e., large negative numbers) represent good rejection performance; high values (small negative numbers) represent high susceptibility to interference. An example of D/U ratios measured for the FCC (Federal Communications Commission) report (OET Report FCC/OET 07-TR-1003 Mar. 30, 2007) ranged from below −74 dB to −20 dB.

For example, in a common scenario, the primary system may be a broadcasting service, such as a digital television broadcast system, and the secondary system may be a two-way voice and data communications service. The interference to the primary system receivers is caused by the signals from the secondary system transmitters being potentially significantly stronger than the primary system signals from more distant primary system transmitters.

The nature of many primary broadcast services is such that most primary broadcast service receivers are located a long distance from the primary broadcast service transmitters. The size of the primary system coverage area is typically many tens of kilometers in radius. In some cases, the radius may be a hundred or more kilometers if the primary system transmitter is located on high ground. The historic nature of the primary system deployments is that many channels are unused in each area in order to minimize the possibility of interference from signals from different areas. Also, because of the separation distance between primary system receivers and transmitters, the primary system receivers are typically designed for sensitivity (i.e., to receive weak signals), but are not typically designed to minimize their sensitivity to strong signals in adjacent channels (since all the transmitters are assumed to be far away and adjacent channels are not assigned for use in the same area). Such receivers typically do not perform well when there is a strong signal on channels adjacent to a weak one being received.

FIG. 1 is a diagram illustrating the potential interference to primary system receivers caused by secondary system signals generated by secondary system transmitters. FIG. 1 includes an arrangement 100 of primary system and secondary system equipment, including a primary system transmitter 102, two primary system receivers 106,108, a secondary system base station 104 that has a secondary system transceiver 130, and two secondary system mobile stations 110,112 with secondary system transceivers. In FIG. 1, the secondary system is a two-way voice and data communications service, and the secondary system mobile stations 110,112 are shown as mobile telephones. In FIG. 1, the primary system is a digital broadcast service and the primary system receivers 106,108 are personal computers incorporating over-the-air broadcast TV receivers, but in other examples may be typical broadcast TV receivers found in conventional televisions.

In operation, the primary system transmitter 102 broadcasts primary system signals 118 that are received at the primary system receivers 106,108 and the secondary system transceiver 130 of the secondary system base station 104 transmits secondary system signals 122 in the bandwidth allocated to an unused channel of the primary system to service the secondary system mobile stations 110,112. The secondary system, represented by the secondary system base station 104 and the secondary system mobile stations 110,112 adapts its channel plan to fit within the available unused primary channels. Both the primary system and the secondary systems have their own channel plans, but the channels of the secondary system are arranged to fit within the bandwidth of the channels of the primary system.

In the illustrated arrangement 100, the secondary system base station 104 is closer to the primary system receivers 106,108 than the primary system transmitter 102. This condition is sometimes referred to as the "near-far" problem. The primary system receivers 106,108 are trying to receive weak primary system signals 118 from the distant primary system transmitter 102 in the presence of strong near secondary system signals 122 in a potentially adjacent channel. The strong near secondary system signals 122 transmitted by the transceiver 130 of the secondary system base station 104 cause interference 126 at the primary system receivers 106, 108, which can potentially degrade the performance of the primary system. Even if the secondary system base station 104 is located relatively distant to the primary system receivers 106,108, one or more secondary system transceivers, such as the mobile stations 110,112 illustrated in FIG. 1, may be located close to the primary system receivers 106,108, and the transmission from the mobile stations 110,112 to a secondary system base station, such as the secondary system base station 104 shown in FIG. 1, may cause interference to the primary system receivers 106,108.

In the past, use has been made of some of the bandwidth in the unused channels in primary systems, such as the broadcast service, by maintaining a large separation between the primary system receivers 106,108 and the secondary system signals 122, using low power for the secondary system signals 122 to restrict their range of operation and using directional antennas for the secondary system designed to direct the secondary system signals 122 away from the primary system receivers 106,108. For example, analogue AM/FM radio broadcasts currently permit unused channel sharing at low power. These approaches are not suitable for many applications as their area coverage is too small and only a few channels can be utilized.

Figure 2:
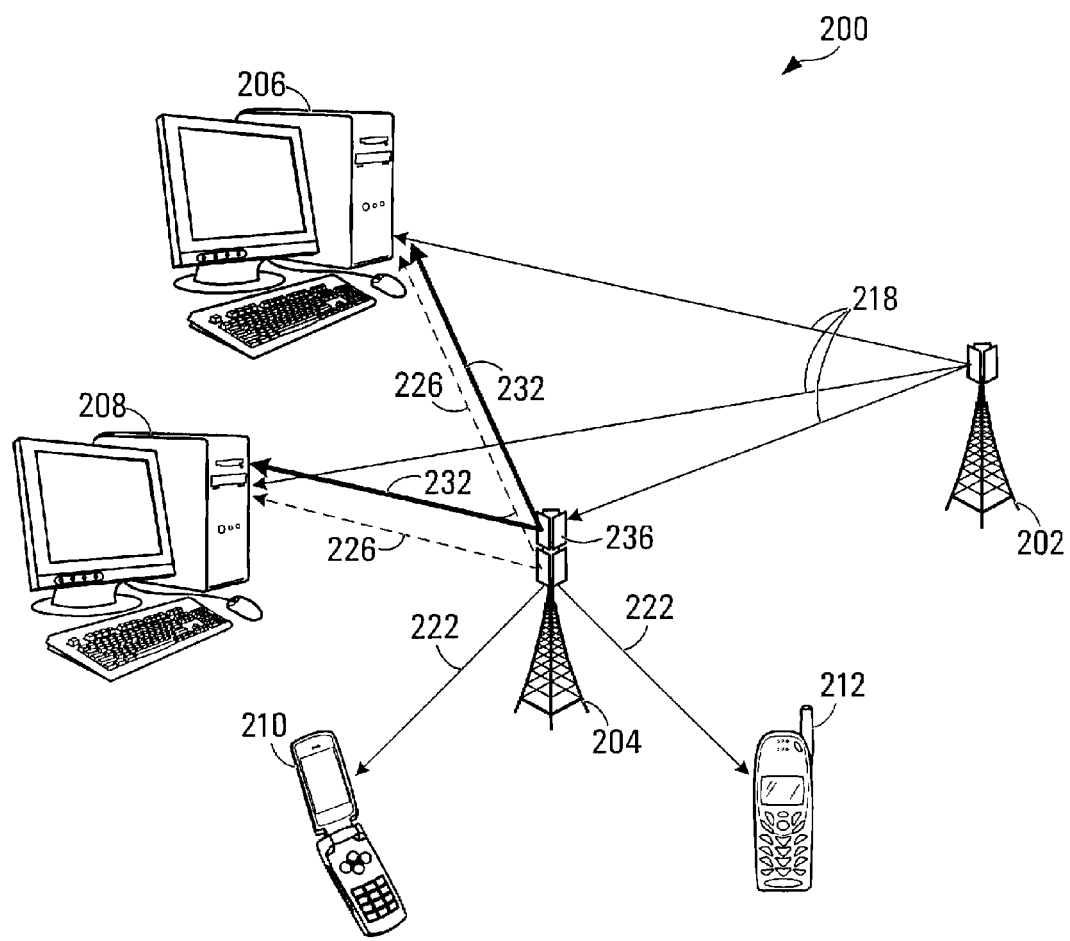
FIG. 2 is diagram illustrating re-transmission of primary system signals using secondary system transceivers in accordance with an embodiment of the present invention.

FIG. 2 illustrates an arrangement 200 of primary system equipment and secondary system equipment in accordance with an embodiment of the present invention. In FIG. 2, the primary system equipment includes a primary system transmitter 202 and two primary system receivers 206,208, which are typically over-the-air broadcast TV receivers but could also be personal computers equipped with broadcast receivers as shown. More generally, any number of primary system transmitters, such as primary system transmitter 202, and any number of primary system receivers, such as primary system receivers 206,208, may be included in embodiments of the present invention. The secondary system equipment includes a secondary system base station 204 and two secondary system mobile stations 210,212 with secondary system transceivers. More generally, secondary system equipment may include any number of secondary system base stations, such as the secondary system base station 204, and any number of pieces of secondary system user equipment, such as the secondary system mobile stations 210,212. As in FIG. 1, in FIG. 2 the primary system is a digital broadcast service and the secondary system is a wireless two-way voice and data communications service that uses one or more unused channels of the primary system to communicate with secondary system user equipment, such as the secondary system mobile stations 210,212, which are shown as mobile telephone stations. More generally, secondary system user equipment may include any form of wireless communication device, such as mobile telephone stations like the ones shown in FIG. 2, personal digital assistant and wireless-capable personal computers.

In FIG. 2, the secondary system base station 204 includes a secondary system transceiver 236 that has both a primary system portion for handling primary system signals and a secondary system portion for handling secondary system signals, in contrast to the secondary system transceiver 130 shown in FIG. 1, which only handles secondary system signals.

In operation, the primary system transmitter 202 transmits primary system signals 218 that are received by the primary system receivers 206,208. As in FIG. 1, the secondary system base station 204 transmits secondary system signals 222 to the secondary system mobile stations 210,212 via its secondary system transceiver 236, which causes interference 226 in the primary system receivers 206,208. However, in FIG. 2, the secondary system base station 204 receives the primary system signals 218 from the primary system transmitter 202 and re-transmits the primary system signals 218 as re-transmitted primary system signals 232 with a delay that is less than the multi-path delay handling capability of the primary system receivers 206,208. The primary system receivers 206,208 receive the primary system signals 218 and the re-transmitted primary system signals 232.

The secondary system base station 204 may receive the primary systems signals 218 over-the-air from the primary system transmitter as illustrated, or the primary system signal may be received by alternate means such as via a wired/fibre cable, or another form of wireless connection such as satellite signal or terrestrial radio system. The secondary system base station 204 may use, for example, the same distribution source for the primary signal as the primary system transmitter 202. This arrangement has the advantage of minimising the delay in reception of the primary signals and so better enabling the retransmission to be made within the primary system multi-path delay limit. While in some situations the primary system and the secondary system are operated by different system providers (i.e. Broadcast TV network and mobile radio network operators), in some embodiments the primary and secondary systems are operated by the same (or closely affiliated) operator. This could potentially allow the operator to make better use of their spectrum assignment and at the same time assure high quality of service to both the primary and secondary users.

In some embodiments, the effective isotropic radiated power (EIRP) of the re-transmitted primary system signals can be adjusted on a per-channel basis, to maintain an acceptable signal-to-interference level at the primary system receivers 206,208, where the ratio of the summed power of the original and re-transmitted primary system signals 232 to the in-band power of the secondary system signals 222 is taken as the signal-to-interference level. For example, if an adjacent channel is being used by the secondary system signals 222 and the typical primary system receiver performance requires signals in the adjacent channel to be no more than 20 dB stronger than the received primary system signal, then the re-transmitted primary system signal could be set at a power level that is no less than 20 dB below the power of the secondary system signal transmission. In some embodiments, re-transmitted signals in other channels are set at levels commensurate with their proximity to the secondary system signal to be transmitted and the primary system receiver performance for these other channels. For example, if the secondary system base station 204 is attempting to use a co-channel to the primary system, i.e., the secondary system is attempting to use the same bandwidth allocated to a primary system channel that is being used by the primary system, then the re-transmitted primary signal 232 may need to be set, for example, at 20 dB higher than the secondary system signal on the co-channel to preserve a suitable positive signal to noise ratio at the primary system receivers 206,208. It should be noted that ratios of the transmitted powers may take into account the effect of antenna gains and losses in the secondary system transceiver 236.

In some embodiments, combinations of used and unused channels of the primary system may be used by the secondary system. The secondary use of a used primary channel is possible by coding the secondary signal to compensate for the presence of a stronger primary signal. Two such schemes are the "dirty-paper" coding and interference reduction methods described later herein. In such techniques, the coding of the secondary signal is performed based on knowledge of the primary signal. The secondary receiver is thus able to receive the intended secondary signal by also making use of its knowledge of the primary signal.

In some embodiments, the delay of the re-transmitted primary system signals 232 is set to be within the multi-path propagation delay acceptable for the primary system receivers 206,208. For example, if the primary system signal is an Orthogonal Frequency Division Multiplex (OFDM) transmission, such as a Digital Video Broadcast (DVB), Forward Link Only (FLO) and WiMAX, the primary system signals 218 are re-transmitted such that the primary system signals 218 and the re-transmitted primary system signals 232 both arrive at the primary system receivers 206,208 within the cyclic prefix interval of the primary system signal format.

Minimising the delay in the processes of reception and re-transmission of the primary signal at the secondary re-transmitter may ensure that the re-transmitted primary system signals 232 arrive with the primary system signals 218 within the cyclic prefix interval of the primary system signal format. The cyclic prefix interval is an implementation specific detail, and therefore the requirement for the timing delays associated with reception and re-transmission of the primary signals at the secondary system transceivers is likewise implementation specific. Use of the primary system's primary signal distribution network (satellite or terrestrial links) to distribute the primary signals to the secondary transceivers for re-transmission could potentially minimise delay in re-transmission of the primary signals. Typically the multi-path delay tolerance of the primary signal waveform design (e.g. cyclic prefix) is more than is needed for the total propagation delay across the coverage area. If the secondary re-transmitter receives the primary signal as an over-the-air signal from the primary transmitter, then it must retransmit within the cyclic prefix tolerance in order for the re-transmitted primary signal to arrive within the cyclic prefix tolerance of the primary receivers. It is only the difference in arrival time of the primary signal and the re-transmitted signal at the user's primary receiver that must be within the delay tolerance, so the common propagation delay between the primary transmitter and the re-transmitter does not limit the usage of re-transmitters. In some cases the primary and re-transmitter may make use of an independent time clock (e.g. GPS signals) for the timing of signals. In these situations, for example, an aspect of transmitted signal has a pre-defined relation to universal time (i.e. the frame start is always aligned with the second-to-second transition of UTC (Co-ordinated Universal Time)). Some primary broadcast systems, such as the single frequency network (SFN) for DVB (Digital Video Broadcast), use primary system re-transmitters for enhanced coverage in some areas, and use these techniques to maintain re-transmissions within the delay tolerance.

In the case of a single carrier primary system, such as National Television System Committee (NTSC), Advanced Television System Committee (ATSC) and Advanced Vestigial Side-Band (A-VSB), the primary system signal 218 is retransmitted at the secondary system base station 204 such that primary system signals 218 and the re-transmitted primary system signals 232 arrive at the primary system receiver within the window for the equalizer in the primary system receivers 206,208.

In some embodiments, the secondary system transceiver 236 of the secondary system base station 204 uses its knowledge of the primary system signals 218 to minimize interference with its signals and services. For example, this may involve using techniques such as interference cancellation to minimize the interference to the receiving portion of its secondary system transceiver 236 due to the proximity to the primary system re-transmissions. The secondary system transceiver 236 may also code its transmissions to minimize the effects of the re-transmitted signal on the secondary system receivers in the secondary system mobile stations 210, 212. For example, in some embodiments, the secondary system transceiver 236 uses the coding described in "Writing on Dirty Paper" by Max H. Costa, *Information Theory, IEEE Transactions* on, Vol. 29, No. 3. (1983), pp. 439-441, which is hereby incorporated by reference in its entirety.

In FIG. 2, the re-transmitted primary system signals 232 are shown as being generated by the secondary system base station 204. More generally, in some embodiments, either, or both, the secondary system base station 204 or the secondary system mobile stations 210,212 re-transmits the primary system signals 218.

While the secondary system base station 204 in FIG. 2 is shown as receiving the primary system signals 218 directly from the primary system transmitter 202, more generally, the base station 204 may be received over-the-air from the primary system transmitter, via a wire or fibre connection, or from a satellite system or distribution network such as may be used to send signals to the primary system transmitter 202.

While the secondary system transceivers 210,212 and the primary system transceivers are located in separate devices in FIG. 2, in some embodiments, a piece of user equipment may include a primary system receiver and a secondary system receiver.

In some embodiments, the secondary system base station 204 may use directional antennas to focus the secondary system signals 222 and the re-transmitted primary system signals 232 in different directions if the intended coverage areas for the primary system and the secondary system are different or to control the desired power ratio of primary and secondary signals.

The re-transmission delay of the re-transmitted primary system signal 232 appears like a multipath propagation delay component of the primary system signal 218 to the primary system receivers 206,208. Indeed, the receiving techniques at the primary system receivers take advantage of multipath signals to give better reception. In the broadcast service such re-transmission are sometimes deliberately introduced in Single Frequency Networks (SFN). The presence of the re-transmitted primary system signals 232 can potentially serve to significantly enhance the broadcast system coverage. When implemented in SFN, secondary system base stations become the "infill" station of the SFN.

Embodiments of the present invention are applicable to many other scenarios of systems reusing unused channels. One example is broadcast channel sharing discussed above, but the technique also could be use for satellite communication channel reuse with terrestrial links. In that scenario, the terrestrial network would re-transmit the satellite signal in areas where it might be interfered with by shared channels or adjacent terrestrial signals. This could be used for the use of adjacent channels in such systems as broadcast satellite services (BSS) or satellite navigation services such as global positioning systems (GPS) or the ancillary terrestrial component (ATC) of mobile satellite systems (MSS).

Embodiments may also be used for sharing among the Public Safety Agency (PSA) channels where there may be sharing with adjacent broadband services. Similarly, embodiments may be used to improve channel usage of OFDM transmission systems. In this scenario, the re-transmission of both local and distant channels may reduce out-of-channel interference limitations in system performance. Such multiple channel systems may incorporate linear amplifiers and transmitters to avoid undue generation of excess intermodulation products and out-of-channel emissions.

In some embodiments, the secondary system base station 204 can use its knowledge of the primary system signal to code the secondary transmitted signal 222. For example, the secondary system base station 204 may synchronize its transmission symbol rate to that of the primary system signal to reduce interference. The base station 204 may also adjust its secondary system signal waveform and transmission timing to fit into areas of the primary system signal waveform that are most robust to interference. For example, analogue television systems include a "blanking interval" in which no picture information (i.e. no picture colour or luminance information) is being sent. During this interval, which occurs at the rate of the picture display, the apparatus in the TV set returns its picture scan beam and internal circuitry to the start position, ready to project the next picture. The interval is a prominent part of the signal waveform and is also used to maintain timing synchronisation of the picture display between the transmitter and the receiver. As no picture information is being sent, usually the TV signal is less sensitive to interference during this interval. The analogous situation for digital transmission systems is the frame synch transmission. This is sent regularly to maintain timing synchronisation between the signal coders in the transmitter and receiver. Usually it is a waveform that is less sensitive to interference than used for other transmission intervals. Hence, in some embodiments, the secondary system signals are adapted to be active during the intervals when the primary signals are less sensitive to interference. Placing some of the secondary transmissions in the "blanking interval" of a broadcast television signal, for example, may further minimize interference to a television broadcast receiver.

Figure 3:
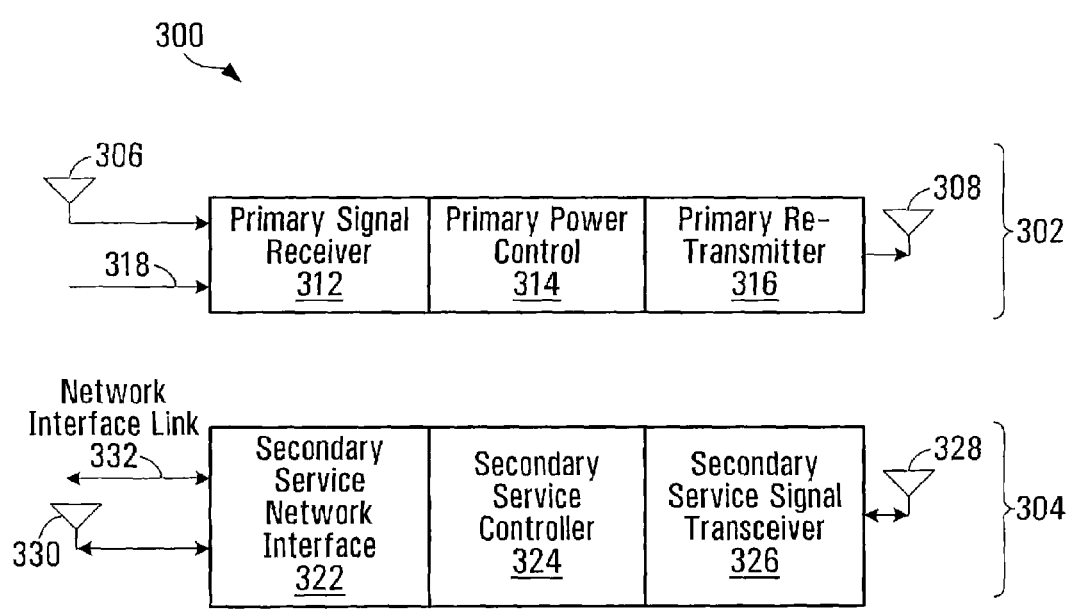
FIG. 3 is a block diagram of a secondary system transceiver in accordance with an embodiment of the present invention.

FIG. 3 is a block diagram of an example implementation 300 of a secondary transceiver in accordance with an embodiment of the present invention, such as the secondary transceiver 236 in secondary system base station 204 on the secondary system transceiver in either of the secondary system mobile stations 210,212 shown in FIG. 2. Only the portions of the secondary system transceiver apparatus pertinent to the present invention are shown in FIG. 3. The example implementation 300 includes a primary system signal re-transmitting portion 302 and a secondary system signal portion 304. The primary system re-transmitting portion 302 includes a primary system signal receiver 312, a primary power control 314, a primary re-transmitter 316 and a primary re-transmit antenna 308.

In some embodiments, the primary system re-transmitting portion 302 includes a primary receive antenna 306 to receive the primary system signals from a primary system transmitter or another radio system, or the primary system signal receiver 312 may receive the primary system signals from a network source 318 such as a cable or fibre. The secondary system signal portion 304 includes a secondary system network interface 322, a secondary system controller 324, a secondary system signal transceiver 326 and a secondary system antenna 328.

In some embodiments, such as in a base station, the secondary system network interface 322 may have a wired or fibre connection as a network interface link 332 and/or it could have a wireless connection via a suitable antenna 330 if the base station was wirelessly linked or functioning as a relay node. If the secondary system transceiver were implemented in a piece of user equipment, such as a secondary system mobile station, the secondary system network interface 322 would typically have a wireless link with a suitable antenna 330. Some user equipment for example, such as a home base station or local area network access point, may use a wired or fibre network interface link 332.

In operation, the primary system signal receiver 312 receives primary system signals from either the antenna 306 or via the network source 318. The primary system signal receiver is used to receive the primary system signals of the primary system transmission. As there may be multiple primary system signals to re-transmit, there may be multiple primary system signal receivers, or one receiver may be used that is capable of collecting multiple signals. The primary system signal is then conditioned to the appropriate power level and adjusted for the desired transmission delay by the primary power control 314. The conditioned and delayed primary system signal is then re-transmitted by the primary re-transmitter 316 via the antenna 308.

The secondary system network interface 322 interfaces with its system network via either the wired or fibre network interface link 332 or the wireless link via the antenna 330. Network information received via the secondary system network interface 322 is passed to the secondary system controller 324 that directs the actions of the base station and its traffic and associated network and user equipment. The secondary system controller 324 is functionally connected to the secondary system signal transceiver 326 that receives and transmits secondary system signals via the secondary system antenna 328.

Figure 4:
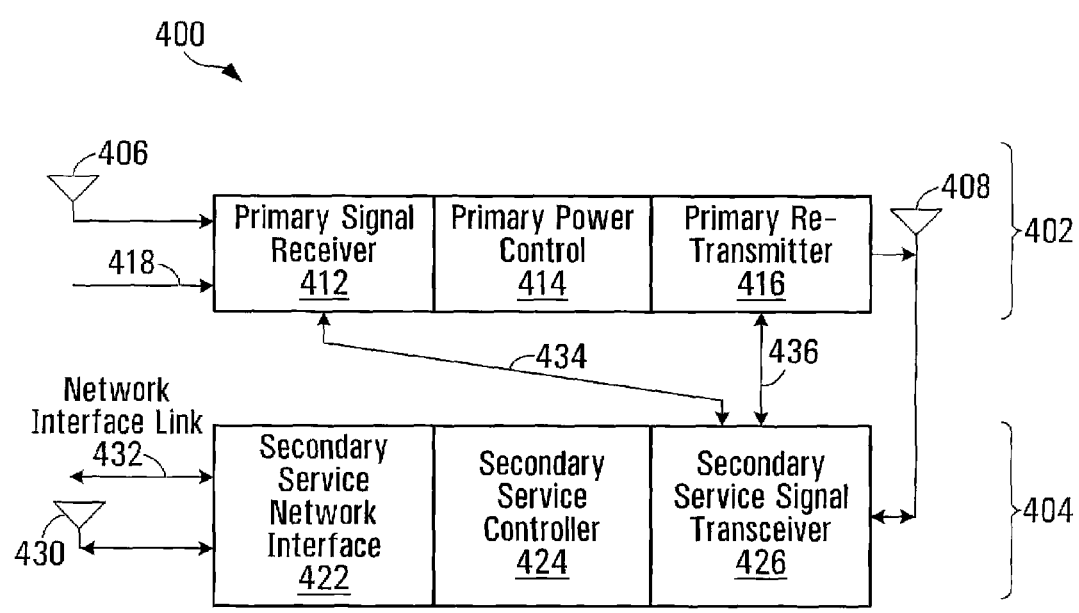
FIG. 4 is another block diagram of a secondary system transceiver in accordance with an embodiment of the present invention.

In FIG. 3, the primary system portion 302 and the secondary system portion 304 of the example implementation 300 have separate antennas 308,328. FIG. 4 illustrates an example implementation 400 of a secondary system transceiver in accordance with an embodiment of the present invention in which a primary system portion 402 and a secondary system portion 404 share an antenna 408. As in FIG. 3, the primary system portion 402 shown in FIG. 4 includes a primary system signal receiver 412 that may have either, or both, of a wireless input via an antenna 406 and a wired or fibre input 418, a primary power control 414 and a primary re-transmitter 416. Similarly, the secondary portion 404 shown in FIG. 4 includes a secondary system network interface 422 with at least one of a wired or fibre network interface link 432 and a wireless network link via an antenna 430. The secondary system portion 404 also includes a secondary system controller 424 connected to the secondary system network interface and a secondary system signal transceiver 426 that is connected to the secondary system controller 424. However, unlike FIG. 3, in FIG. 4, the primary re-transmitter 416 and the secondary system signal transceiver 426 make use of the common antenna 408.

In some embodiments, it may be possible to share the common antenna 408, or some of its constructs such as radiating elements, with the antenna 406 used to receive primary system signals. Many "antennas" or "antenna systems" include a plurality of radiating elements. It is the combination of these elements that gives the directional pattern and gain of the overall "antenna". The primary and secondary systems may use a different set of the radiating elements for their transmissions. While one system might use all the radiating elements of the antenna, the other may use fewer. Such use would enable the two systems to have differing radiated power and coverage regions, for example.

The primary system portion 402 may share the same "antenna" for its reception (406) with that of its transmitter (408), if the primary system portion 402 receives its primary signals on a channel that is different from its transmitting channel (e.g. the reception is from a satellite transmitter). To the extent that the antenna 408 covers both the reception and transmission channel with sufficient gain, shared use is possible. However, if the reception channel is the same as the transmitting channel, then the functionality of the two antennas 406,408 cannot be combined, as the transmitted signal would feed-back into the receiver of its own signals. Indeed, one practical reason for using separated antennas 406 and 408 is to avoid such feed-back. Often the receiving antenna is directional and pointed at the source of the primary signals in order to suppress the reception of local signals. Such separated antennas are part of the design of same channel re-transmitting stations for SFN, for example.

FIG. 4 includes a link 434 between the primary system signal receiver 412 and the secondary system signal transceiver 426 and a link 436 between the primary re-transmitter 416 and the secondary system signal transceiver 426. These links 434,436 supply information about the primary system signal and are used by the transceiver 426 to design its signals to minimize interference. This may include, for example, using the coding described in "Writing on Dirty Paper" by Max H. Costa, *Information Theory, IEEE Transactions* on, Vol. 29, No. 3. (1983), pp. 439-441, to code the secondary system signals based on the primary system signal. These links 434,436 may also provide synchronization information for the timing and frequency control of the secondary system signals in order to minimize interference, as described above. The information about the primary transmitted signal may also be used for interference cancellation/reduction in the receiver of the secondary transceiver (426). Use of such interference cancellation/reduction, for example, could potentially improve the performance of the secondary system to receive signals from its mobile stations (210, 212).

In Some embodiments, a re-transmitting primary system portion, such as the primary system portions 302,402 shown in FIGS. 3 and 4, is as simple as a "repeater" that simply receives the primary signals from the primary transmitter via its receiving antenna (306,406) and retransmit them at a suitable power level with minimum delay through its transmitting antenna (308,408).

In some embodiments, a re-transmitting primary signal portion of a secondary system transceiver is similar to a primary system transmitting station, in that it would receive the program information from the studio link (wired link 318,418 or antenna 306,406), format the primary system signal and transmit it from its transmitting antenna (308,408) at a suitable power level and synchronised with the transmissions of the primary service. Devices of either type may be used for the SFN deployments, for example.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. A method comprising:
    in secondary system equipment of a secondary communications system:
        receiving a primary system signal on a channel of a primary communications system which comprises primary system equipment different from the secondary system equipment;
        re-transmitting a delayed version of the primary system signal on the channel of the primary communications system; and
        transmitting a secondary system signal to other secondary system equipment on a channel of the secondary communications system, wherein the channel of the secondary communications system is within at least part of a bandwidth allocated to at least one unused channel of the primary communications system.

2. The method of claim 1, further comprising:
    fitting a channel plan for the secondary communications system within at least some of the channel bandwidths of the primary communications system.

3. The method of claim 1, wherein re-transmitting a delayed version of the primary system signal comprises re-transmitting the delayed version of the primary system signal with a power selected to preserve a signal-to-interference ratio of the primary system signal at primary system receivers of the primary communications system.

4. The method of claim 1, wherein timing of the delayed version of the primary system signal is selected to be within multi path delay capability of primary system receivers of the primary communications system.

5. The method of claim 1, further comprising:
    making use of the received primary system signal to at least partially reduce interference to the secondary system signal.

6. The method of claim 5, wherein making use of the received primary system signal to at least partially reduce interference to the secondary system signal comprises coding the secondary system signal making use of knowledge of the primary system signal.

7. The method of claim 6, wherein coding the secondary system signal comprises coding the secondary system signal using dirty paper coding.

8. The method of claim 1, wherein transmitting the secondary system signal to other secondary system equipment comprises transmitting a secondary system signal waveform that reduces interference to primary system receivers of the primary communications system.

9. The method of claim 8, wherein the secondary system signal has a symbol rate that is synchronized to a symbol rate of the primary system signal.

10. The method of claim 1, wherein the secondary system equipment comprises any one of a base station, a mobile telephone station, a personal digital assistant, a wireless local area network access point and a wireless-capable personal computer.

11. The method of claim 1, wherein the primary system signal has an orthogonal frequency division multiplexing (OFDM) signal format.

12. The method of claim 11, wherein timing of the delayed version of the primary system signal is selected such that the primary system signal and the re-transmitted delayed version of the primary system signal arrive at primary system receivers of the primary communications system within a cyclic prefix interval of the OFDM signal format.

13. The method of claim 11, wherein the OFDM signal format comprises any one of: Digital Video Broadcast (DVB) signal format, Forward Link Only (FLO) signal format and WiMAX signal format.

14. The method of claim 1, wherein the primary system signal has a single carrier signal format.

15. The method of claim 14, wherein the single carrier signal format comprises any one of: National Television System Committee (NTSC) signal format, Advanced Television System Committee (ATSC) signal format and Advanced Vestigial Side-Band (AVSB) signal format.

16. The method of claim 1, wherein timing of the delayed version of the primary system signal is selected such that the primary system signal and the re-transmitted delayed version of the primary system signal arrive at primary system receivers of the primary communications system within an equalizer window.

17. The method of claim 1, wherein receiving a primary system signal comprises receiving a plurality of primary system signals, and wherein re-transmitting a delayed version of the primary system signal comprises re-transmitting a delayed version of the plurality of primary system signals.

18. The method of claim 1, wherein the primary communications system provides a broadcast television service, and wherein transmitting the secondary system signal comprises transmitting a plurality of secondary system signals, wherein at least some of the plurality of secondary system signals are transmitted during blanking intervals of the broadcast television service.

19. The method of claim 1, wherein the primary communications system provides a broadcast service and the secondary communications system provides a two-way communication service.

20. Communication equipment, comprising:
    a primary system portion that:

receives at least one primary system signal on a channel of a primary communications system which comprises primary system equipment; and re-transmits a delayed version of the at least one primary system signal on the channel of the primary system; and a secondary system portion that transmits a secondary system signal to secondary system equipment of a secondary communications system on a channel of the secondary communications system, the secondary communications system comprising the secondary system equipment and other secondary system equipment different from the primary system equipment, wherein the channel of the secondary communications system is within at least part of a bandwidth allocated to at least one unused channel of the primary communications system.

21. The communication equipment of claim 20, further comprising:

a primary system signal power controller that conditions a power level of the at least one primary system signal that is received by the primary system portion such that the re-transmitted delayed version of the at least one primary system signal has a power selected to preserve a signal-to-interference ratio of the at least one primary system signal at primary system receivers of the primary communications system.

22. The communication equipment of claim 20, wherein the primary communications system provides a broadcast television service, wherein transmitting a secondary system signal comprises transmitting a plurality of secondary system signals, and wherein the primary system portion is configured to transmit at least some of the plurality of secondary system signals during blanking intervals of the broadcast television service.

23. The communication equipment of claim 20, wherein the primary communications system provides a broadcast service and the secondary communications system provides a two-way communication service.

* * * * *